(12) United States Patent  
Gayk

(10) Patent No.: US 11,001,285 B1
(45) Date of Patent: May 11, 2021

(54) MULTI-FUNCTIONAL UTILITY CART AND METHOD OF USE

(71) Applicant: Ray Gayk, Menifee, CA (US)

(72) Inventor: Ray Gayk, Menifee, CA (US)

(*) Notice: Subject to any disclaimer, the term of this patent is extended or adjusted under 35 U.S.C. 154(b) by 0 days.

(21) Appl. No.: 16/851,733

(22) Filed: Apr. 17, 2020

(51) Int. Cl.
 *B62B 1/00* (2006.01)
 *B62B 1/04* (2006.01)
 *B62B 1/12* (2006.01)
 *B62B 3/02* (2006.01)

(52) U.S. Cl.
 CPC .............. *B62B 1/002* (2013.01); *B62B 1/042* (2013.01); *B62B 1/125* (2013.01); *B62B 3/022* (2013.01); *B62B 2205/104* (2013.01); *B62B 2205/33* (2013.01); *B62B 2206/06* (2013.01); *B62B 2301/04* (2013.01); *B62B 2301/05* (2013.01)

(58) Field of Classification Search
 CPC ........... B62B 1/02; B62B 1/042; B62B 3/022; B62B 1/125; B62B 2205/104; B62B 2205/13; B62B 2206/06; B62B 2301/04; B62B 2301/05
 See application file for complete search history.

(56) References Cited

U.S. PATENT DOCUMENTS

| | | | |
|---|---|---|---|
| 2,680,027 A * | 6/1954 | De Puydt | B62B 1/14 280/47.28 |
| 2,901,262 A | 8/1959 | Berlin | |
| 3,052,484 A | 9/1962 | Huffman et al. | |
| 3,081,883 A * | 3/1963 | Minty | B66C 19/005 212/344 |
| 3,804,432 A | 4/1974 | Lehrman | |
| 4,307,892 A * | 12/1981 | Miles | B62B 13/18 280/9 |
| 4,362,458 A * | 12/1982 | Jantzi | B62B 5/0083 254/2 R |
| 4,537,421 A | 8/1985 | Teachout | |
| 4,783,025 A * | 11/1988 | Moffett | A61G 3/00 244/118.5 |
| 4,865,346 A | 9/1989 | Carlile | |
| 5,207,439 A | 5/1993 | Mortenson | |
| 5,213,360 A * | 5/1993 | Lin | A47D 1/02 280/648 |
| 5,333,885 A | 8/1994 | Pullman | |
| 5,626,352 A | 5/1997 | Grace | |

(Continued)

*Primary Examiner* — John D Walters
*Assistant Examiner* — James J Triggs
(74) *Attorney, Agent, or Firm* — Grants Law Firm; Allan Grant

(57) ABSTRACT

A device and method of using a Multi-functional utility cart comprising a base, an axle and wheel assembly, a lower structure, and an upper structure, wherein said axle and wheel assembly are attached to base, base is pivotally attached to lower structure, two upper structural vertical tube frames are slide ably connected to two lower structural vertical tube frames, a rotational tray connected to the upper vertical structural tube frames, a foldable base is connected to the two lower structural vertical tube frames; wherein a user elects to collapse said multi-functional utility cart for easy storage and folding, wherein user would minimize the size of said collapsible frame by sliding two upper vertical tubes into two lower vertical tube frames and user would fold up said base; and wherein said multi-functional utility cart has four types of wheel designs and locations that can be utilized for different tasks.

19 Claims, 10 Drawing Sheets

(56) References Cited

U.S. PATENT DOCUMENTS

| | | | |
|---|---|---|---|
| 5,658,118 A * | 8/1997 | Luca | B62B 5/06 |
| | | | 414/444 |
| 5,915,723 A | 6/1999 | Austin | |
| 6,113,129 A | 9/2000 | Marques et al. | |
| D456,973 S | 5/2002 | Kimpel | |
| 6,880,851 B1 | 4/2005 | Summers et al. | |
| 6,883,267 B1 | 4/2005 | Pruitt | |
| 7,083,174 B2 | 8/2006 | Kane | |
| 7,320,470 B1 | 1/2008 | Butera | |
| 8,162,349 B1 * | 4/2012 | Roselle | B62B 1/008 |
| | | | 280/639 |
| 8,317,205 B2 * | 11/2012 | Udall | A45C 5/14 |
| | | | 280/47.19 |
| 8,641,056 B1 * | 2/2014 | Carter | A45F 3/10 |
| | | | 280/30 |
| 2001/0445715 | 11/2001 | Abraham et al. | |
| 2005/0155799 A1 * | 7/2005 | Chambers | B62B 5/0026 |
| | | | 180/16 |
| 2008/0203705 A1 * | 8/2008 | Zimmerer | B62B 1/14 |
| | | | 280/654 |
| 2012/0159901 A1 * | 6/2012 | Capriotti | B29C 66/24244 |
| | | | 53/285 |

\* cited by examiner

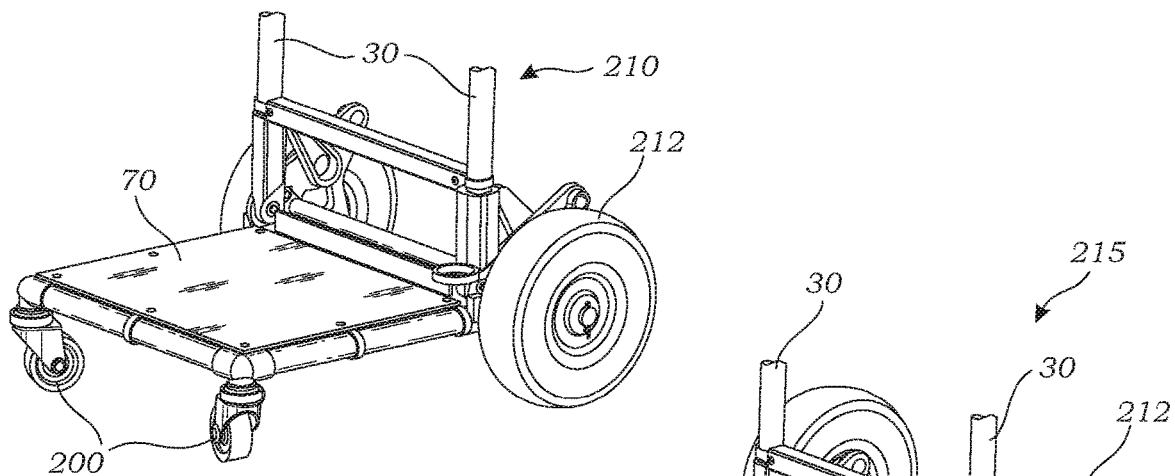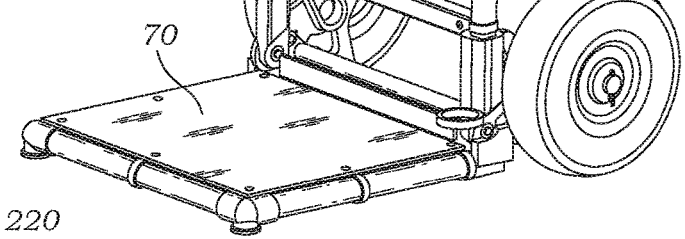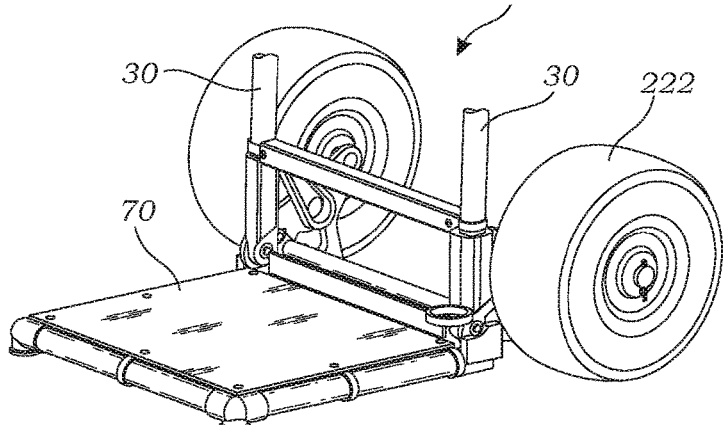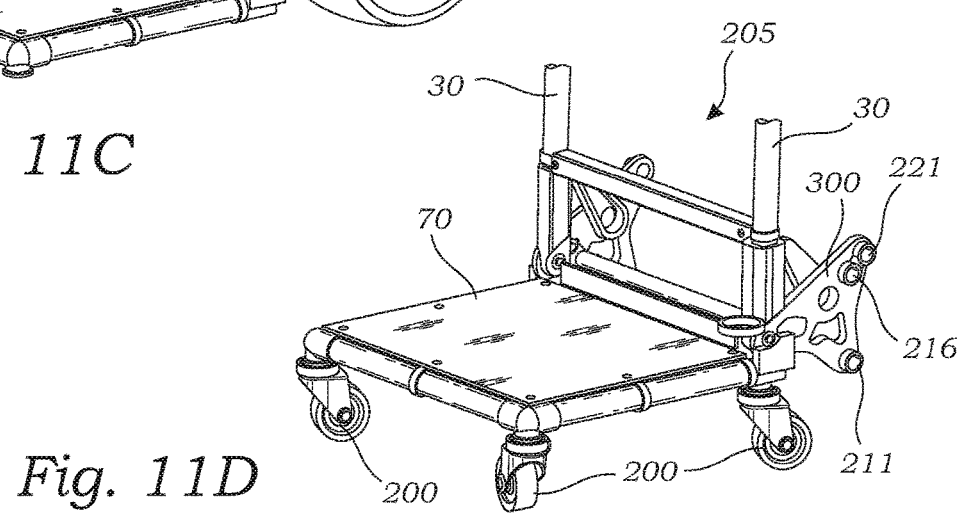
Fig. 11A
Fig. 11B
Fig. 11C
Fig. 11D

MULTI-FUNCTIONAL UTILITY CART AND METHOD OF USE

FIELD OF INVENTION

The invention generally pertains to wheeled carts, and more particularly to a Multi-Functional Utility Cart that is collapsible and can be used for numerous activities and can transport a variety of items and when not in use, can be folded into a compact easily-managed size and a method of using the Multi-Functional Utility Cart.

BACKGROUND ART

One of the oldest and widely-used inventions of mankind is a wheeled structure for transporting items. Commonly, a wheeled structure is referred to as a cart. Depending on the requirement(s), a cart can be made in various configurations and sizes. Most carts include at least two wheels and are either utilized/maneuvered by a person(s) or attached to a vehicle.

There are carts that are specially designed for a specific purpose. For example, there are heavy duty carts for use with construction equipment or building materials, and there are lightweight, relatively smaller carts for use by individuals to transport personal items. While the heavy duty carts can be used to transport smaller and lighter items, the lightweight smaller carts can not typically be used to transport large and/or heavy items. Also, the design of many carts, which consists of a single open box-like structure into which items are placed and often piled on top of each other, is not optimal for multiple items with a variety of shapes.

In addition to carts, one of the most effective devise for transporting items including large heavy items is known as a dolly. The main benefit of a dolly is that once an item is placed on it, the item and the dolly can be tilted backward. By altering the angle, the center of gravity is shifted, thereby allowing even large heavy items to be easily transported by a single person.

It would be very beneficial to provide a cart into or onto which a variety of multiple items could be placed and secured. The cart would have at least two wheels and could be angled backward in the same manner as a dolly. Optimally, the cart could be collapsed into a smaller size for storage and transportation or the cart. A cart with this functionality, that is capable of transporting both lightweight small item as well as larger heavier items, would be significantly helpful to many people who often or less-frequently need to transport items, from one location to another.

A search of the prior art did not disclose any literature or patents that read directly on the claims of the instant invention. However, the following U.S. patents are considered related:

| U.S. Pat. No. | INVENTOR | ISSUED |
| --- | --- | --- |
| 2,901,262 | Berlin | 25 Aug. 1959 |
| 3,804,432 | Lehrman | 16 Apr. 1974 |
| 4,537,421 | Teachout | 27 Aug. 1985 |
| 4,865,346 | Carlile | 12 Sep. 1989 |
| 5,626,352 | Grace | 6 May 1997 |
| 6,113,129 | Marques et al | 5 Sep. 2000 |

The U.S. Pat. No. 2,901,262 discloses a collapsible multi-tier laundry cart commonly used to receive, store and transport articles or parcels during marketing or laundry activities.

The U.S. Pat. No. 3,804,432 discloses a collapsible cart having upper and lower supports which may be moved between operative and in-operative positions. A laundry basket or the like may be supported one ach support. A utility receptacle may also be secured to the collapsible cart.

The U.S. Pat. No. 4,537,421 discloses a foldable dolly in which arms are rotatably mounted to the frame preferably by means of inter-engaging sleeves formed with opposed ramps and opposed shoulders and positioned in relatively vertical alignment. The ramps and shoulders of the first sleeve mate with the ramps and shoulders of the second sleeve. The sleeves are thereby found to permit rotation of the arms between a folded, collapsed position and an extended deployed position.

The U.S. Pat. No. 4,865,346 discloses a hand-propelled cart assembly for use in support of activities such as picnicking or beach-going. The cart includes a separable wheeled frame having an upright section comprising upper and lower portions. A foldable shelf member on the lower portion supports a cooler chest and is provided with elements precluding lateral shifting of the chest during movement of the cart. A pair of swingable arms on the lower portion accommodate one or more seating members such as folding chairs while receiver elements retain an umbrella and rink receptacles. The upper portion of the upright section supports a container having a fold down serving shelf adjacent an accessory panel presenting a radio, thermometer, clock and the like. A further receptacle, in the form of a closable bag is affixed behind the container.

The U.S. Pat. No. 5,626,352 disclose a collapsible, foldable cart, having a frame with spaced-apart first and second longitudinal frame members defining a plane, and a pair of wheels and a wheel axle connected to the frame. The cart has two foldable shelf members pivotally connected to the frame which are movable between a first position for carrying a load on the shelf member, and a second position wherein the shelf member is disposed in a vertical plane and is between the first and second longitudinal frame members. The cart also includes a handle section pivotally connected to the frame. The cart further includes a bottom-most stabilizing shelf member pivotally connected to the frame and movable between a first position of carrying a load on the stabilizing shelf member and a second position wherein the stabilizing shelf member is folded towards the frame to fold-up and collapse the cart.

The U.S. Pat. No. 6,113,129 discloses a wheeled beach cart including a wheeled framework member, a support leg member pivotally associated with the lower end of the framework member and dimensioned to support a beverage cooler and a beach chair support unit rotatably associated with the upper portion of the framework member. The beach chair support unit includes a pair of extendable and retractable support arm member slidably disposed on a cross-piece element rotatably suspended in the framework member.

For background purposes and indicative of the art to which the invention relates, reference may be made to the following remaining patents found in the patent search.

| U.S. Pat. No. | INVENTOR | ISSUED |
| --- | --- | --- |
| D456,973 | Kimpel | 7 May 2002 |
| 3,052,484 | Huffman et al | 4 Sep. 1962 |
| 5,207,439 | Mortenson | 4 May 1993 |
| 5,333,885 | Pullman | 2 Aug. 1994 |
| 5,915,723 | Austin | 29 Jun. 1999 |
| 6,880,851 | Summers et al | 19 Apr. 2005 |

| U.S. Pat. No. | INVENTOR | ISSUED |
|---|---|---|
| 6,883,267 | Pruitt | 26 Apr. 2005 |
| 7,083,174 | Kane | 1 Aug. 2006 |
| 7,320,470 | Butera | 22 Jan. 2008 |
| 2001/0045715 | Abraham et al | 29 Nov. 2001 |

What is needed, is a Multi-Functional Utility Cart (MFUC) device that: is durable and well made, is easy to assemble for use and to collapse for storage or transportation, can be made in various sizes, can be used, assembled and collapsed by a single person, when collapsed, can fit into almost any car trunk, can be used in a variety of environments, such as a beach, mountains or urban areas, can be used by emergency personnel/first responders, can be placed within a small enclosure or hung on a wall when not in use, and is cost effective from both a manufacturer's and consumer's point of view.

It is also an object of the multi-functional utility cart to solve the aforementioned problems discussed above, by creating a device: handle a load large and awkwardly shaped items onto the sturdy aluminum and stainless steel platform base, secure items with attached flexible strap system that can be fastened horizontally or vertically, carry heavy loads confidently across a variety of terrain using modular wheel configuration and optional balloon beach sand tires, adjustable tray with integrated storage shelf that raises/lowers and can be positioned facing forward or flipped backwards, and use it as a work surface, a display stand, hold a market umbrella and much more via an expanding collection of optional accessories.

What is needed, is a Multi-Functional Utility Cart (MFUC) device that allows users to select from four different wheel positions and/or axel designs to adjust for different terrain, such as:

wherein said user elects to convert said multi-functional utility cart into a four wheeled caster rolling utility cart by inserting four casters into said base to provide a smooth rolling surface for said utility cart;

wherein said user elects to convert said multi-functional utility cart into a hybrid utility cart having two caster wheels and also two tire wheels by inserting two casters wheels into the front of the base and by inserting an axle into the two bottom holes of the three axle structures connected to the base and lower vertical tube frames;

wherein said user elects to convert said multi-functional utility cart into a dolly cart having two dolly tires by inserting said axle into the two middle holes of the three axle structures connected to the base and attached the two dolly tires onto the axel and insert the wheel pins into each axel after the tires are positioned on the axel; and wherein said user elects to convert said multi-functional utility cart into an off-road dolly cart having two large dolly tires by inserting said axle into the two top holes of the three axle structures connected to the base and attached the two large dolly tires onto the axel and insert the wheel pins into each axel after the tires are positioned on the axel.

SUMMARY OF THE INVENTION

What began as a simple idea has sparked a revolutionary multifunctional transportation system. Multi-Functional Utility Cart (MFUC) is designed to allow a single person to easily transport a variety of multiple items. In addition to the ability of simultaneously transporting a variety of multiple items, the MFUC's other main advantage is that it can be collapsed to a small size for transportation and storage of the MFUC. When the MFUC is collapsed, it can easily be carried by a single person and placed in a location such as a car trunk. When needed for use, the MFUC can quickly and easily be assembled into four various functional configurations to adjust for various terrain that the cart will roll on.

The Multi-Functional Utility Cart (MFUC) is designed to allow a single person to easily transport a variety of multiple items. Designed originally for travel ball sports staff & parents to transport their gear securely over varied terrain. The MFUC is especially effective for transporting items used during a picnic or other similar activity. A relatively large cooler/ice chest, as well as other items such as cooking utensils, sporting equipment and folding chairs can also be loaded onto the MFUC and simultaneously transported. The MFUC even provides a means for securing and transporting a folding umbrella along with the other items.

In addition to the ability of simultaneously transporting a variety of multiple items, the MFUC's other main advantage is that it can be collapsed to a small size for transportation and storage of the MFUC. When the MFUC is collapsed, it can easily be carried by a single person and placed in a location such as a car trunk. When needed for use, the MFUC can quickly and easily be assembled into its functional configuration.

The MFUC is also an elegant solution for photo/video/audio professionals with the added benefit of an integrated work surface.

In its basic design, the MFUC, which is preferably made of metal, is comprised of:

a base, an axle and wheel assembly, a lower structure and an upper structure. The axle and wheel assembly is attached to the rear of the base, and the base extends forward perpendicularly from the lower end of the lower structure. The base can fold upward to a position interfacing with and parallel to the lower structure. The lower structure has lower left and lower right vertical tubes and a lower horizontal tube. The upper structure has upper left and upper right vertical tubes and an upper horizontal tube. The lower structure is pivotally attached to the upper structure by right and left U-shaped connectors. The upper structure folds downward to a position interfacing with the lower structure.

The upper structure can also include a handle assembly and a tray assembly. The handle assembly extends rearward substantially perpendicular from the upper end of the upper structure. The tray assembly is pivotally attached to and extends perpendicularly forward form the upper structure. The tray assembly can fold downward to a position interfacing with and parallel to the lower half of the upper structure.

When all the MFUC's components are all in their respective upward or downward folded positions, the MFUC is a substantially square, flat structure that can be placed in various locations for storage or transportation. For use, the MFUC's components are un-folded into their functional positions. Not all of the MFUC's components must be utilized. For example, if a person is only transporting a cooler/ice chest, then only the base would be necessary, the tray assembly could remain in its folded position or removed from the MFUC. When the tray assembly remains in its downward folded position or removed, items can be stacked on top of each other from the base. The tray is especially useful during events such as a bar-b-que, when the MFUC can be placed next to the bar-b-que to provide access to items that are conveniently located at a height which does not require bending or stooping.

A second embodiment, which is preferred, utilizes a spring-actuated lower tube to facilitate the opening/unfolding any closing/folding of the MFUC. Additionally, the second embodiment includes multiple modifications and improvements over the first embodiment.

The MFUC is durably constructed to provide years of use. The construction of the MFUC also insures that the MFUC will not be damaged from transporting many different types and sizes of items.

In view of the above disclosure, the primary object of the invention is to provide a multi-functional utility cart that can simultaneously transport a variety of multiple items, and when not in use, can be collapsed to a small, easy to carry and store size.

In addition to the primary object, it is also an object of the invention to provide a multi-functional utility cart that:
is durable and well made,
is easy to assemble for use and to collapse for storage or transportation,
can be made in various sizes,
can be used, assembled and collapsed by a single person,
when collapsed, can fit into almost any car trunk,
can be used in a variety of environments, such as a beach, mountains or urban areas,
can be used by emergency personnel/first responders,
can be placed within a small enclosure or hung on a wall when not in use, and
is cost effective from both a manufacturer's and consumer's point of view.

It is also an object of the multi-functional utility cart to solve the aforementioned problems discussed above, by creating a:
Load large and awkwardly shaped items onto the sturdy aluminum and stainless steel platform base,
Secure items with attached flexible strap system that can be fastened horizontally or vertically,
Carry heavy loads confidently across a variety of terrain using modular wheel configuration and optional balloon beach sand tires,
Adjustable tray with integrated storage shelf that raises/lowers and can be positioned facing forward or flipped backwards, and
Use it as a work surface, a display stand, hold a market umbrella and much more via an expanding collection of optional accessories.

Now I can show up to a location shoot without an assistant and not be stressed out. Having the MFUC with me saves me multiple trips with armloads of gear from vehicle to location. The adjustable tray has come in handy, allowing me to set up my laptop and shoot tethered while still being able to quickly load up and shift to a new nearby location.

It is an object of this invention for the MFUC allows the user to select from four different wheel positions and/or axel designs to adjust for different terrain, such as:
wherein said user elects to convert said multi-functional utility cart into a four wheeled caster rolling utility cart by inserting four casters into said base to provide a smooth rolling surface for said utility cart;
wherein said user elects to convert said multi-functional utility cart into a hybrid utility cart having two caster wheels and also two tire wheels by inserting two casters wheels into the front of the base and by inserting an axle into the two bottom holes of the three axle structures connected to the base and lower vertical tube frames;
wherein said user elects to convert said multi-functional utility cart into a dolly cart having two dolly tires by inserting said axle into the two middle holes of the three axle structures connected to the base and attached the two dolly tires onto the axel and insert the wheel pins into each axel after the tires are positioned on the axel; and
wherein said user elects to convert said multi-functional utility cart into an off-road dolly cart having two large dolly tires by inserting said axle into the two top holes of the three axle structures connected to the base and attached the two large dolly tires onto the axel and insert the wheel pins into each axel after the tires are positioned on the axel.

It is an object of this invention to create a MFUC device that is easy to manufacture, reliable in operation, and relatively inexpensive to produce.

In addition to the above objects, various other objects of this invention will be apparent from careful reading of this specification including the detailed description contained herein below.

BRIEF DESCRIPTION OF THE DRAWINGS

These as well as other features of the present invention will become more apparent upon reference to the accompanying drawings wherein like numerals designate corresponding parts in the several figures summarized as follows:

FIG. 11A is a close up view of the bottom portion of the MFUC—showing one version of a multi-functional utility cart (MFUC) wherein said user elects to convert said multi-functional utility cart into a dolly cart having two caster wheels and also two tire wheels, wherein inserting two casters wheels into the front of the base and by inserting an axle into the two bottom holes of the three axle structures.

FIG. 11B is a close up view of the bottom portion of the MFUC—showing second version of a multi-functional utility cart (MFUC) wherein said user elects to convert said multi-functional utility cart into a dolly cart having two dolly tires by inserting said axle into the two middle holes of the three axle structures.

FIG. 11C is a close up view of the bottom portion of the MFUC—showing third version of a multi-functional utility cart (MFUC), wherein said user elects to convert said multi-functional utility cart into an off-road dolly cart having two large dolly tires by inserting said axle into the two top holes of the three axle structures.

FIG. 11D is a close up view of the bottom portion of the MFUC—showing fourth version of a multi-functional utility cart (MFUC), wherein said user elects to convert said multi-functional utility cart into a four wheeled caster rolling utility cart by inserting four casters into said base to provide a smooth rolling surface for said utility cart.

Other features and advantages of the invention will be become apparent from the following detailed description, taken in conjunction with the accompany drawings, which illustrate, by way of example, various features of the invention.

DETAILED DESCRIPTION

The following detailed description and accompanying drawings are provided for purposes of illustrating and describing presently preferred embodiments of the present invention and are not intended to limit the scope of the invention in anyway. It will be understood that various changes in the details, materials, arrangements of parts or operational conditions which have been herein described and illustrated in order to explain the nature of the invention may be made by those skilled in the art within the principles and the scope of the invention.

Referring to FIGS. 1-11D the Multi-Functional Utility Cart (MFUC) is designed to allow a single person to easily transport a variety of multiple items. In addition to the ability of simultaneously transporting a variety of multiple items, the MFUC's other main advantage is that it can be collapsed to a small size for transportation and storage of the MFUC. When the MFUC is collapsed, it can easily be carried by a single person and placed in a location such as a car trunk. When needed for use, the MFUC can quickly and easily be assembled into four various functional configurations to adjust for various terrain that the cart will roll on.

Figure 1:
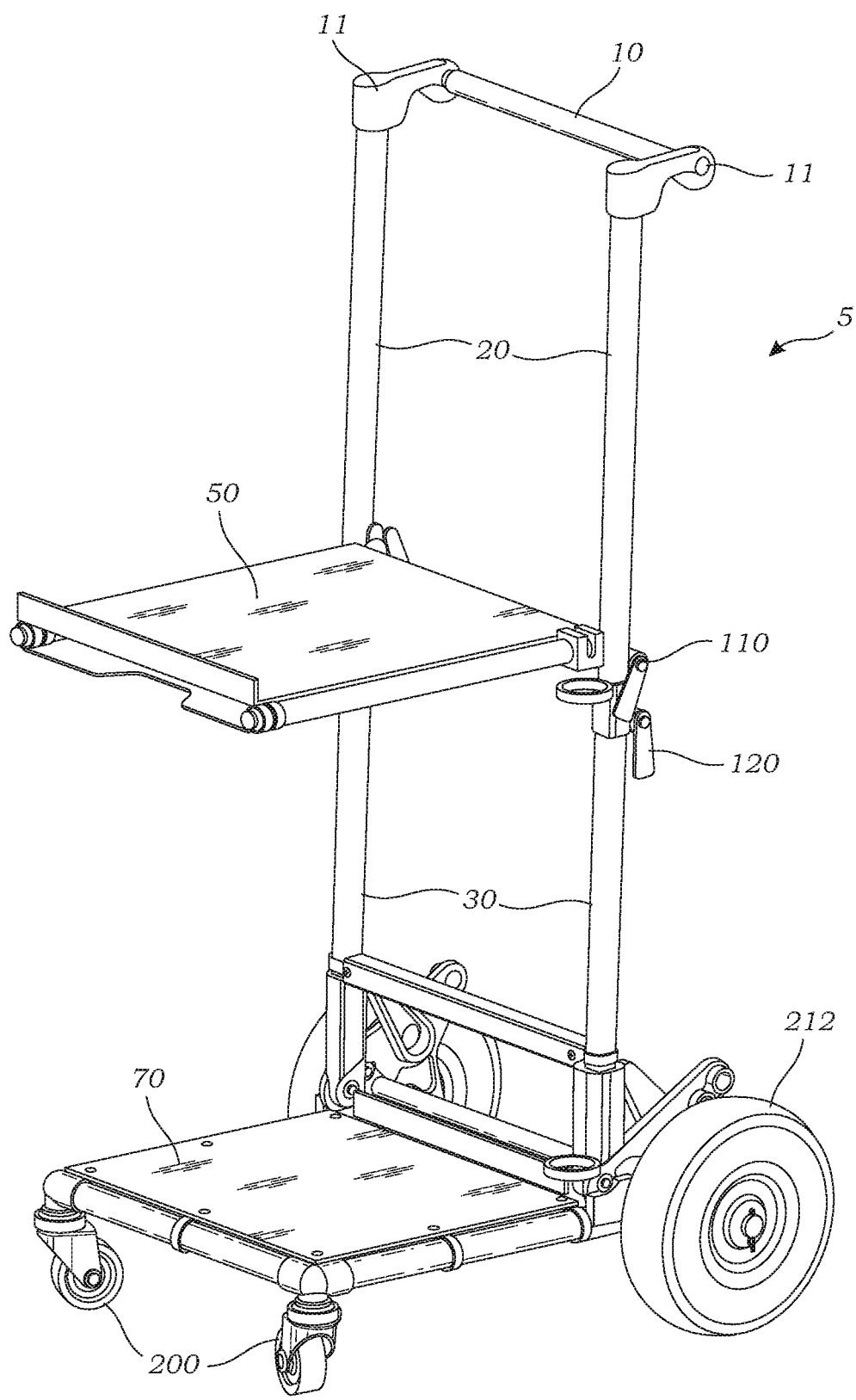
FIG. 1 is a front perspective view of a multi-functional utility cart (MFUC) with two caster wheels and also two tire wheels by inserting two casters wheels into the front of the base and by inserting an axle into the two bottom holes of the three axle structures connected to the base and lower vertical tube frames, in an assembled, ready for use configuration.

FIG. 1 is a front perspective view of a multi-functional utility cart (MFUC) with two caster wheels and also two tire wheels by inserting two casters wheels into the front of the base and by inserting an axle into the two bottom holes of the three axle structures connected to the base and lower vertical tube frames, in an assembled, ready for use configuration.

Figure 2:
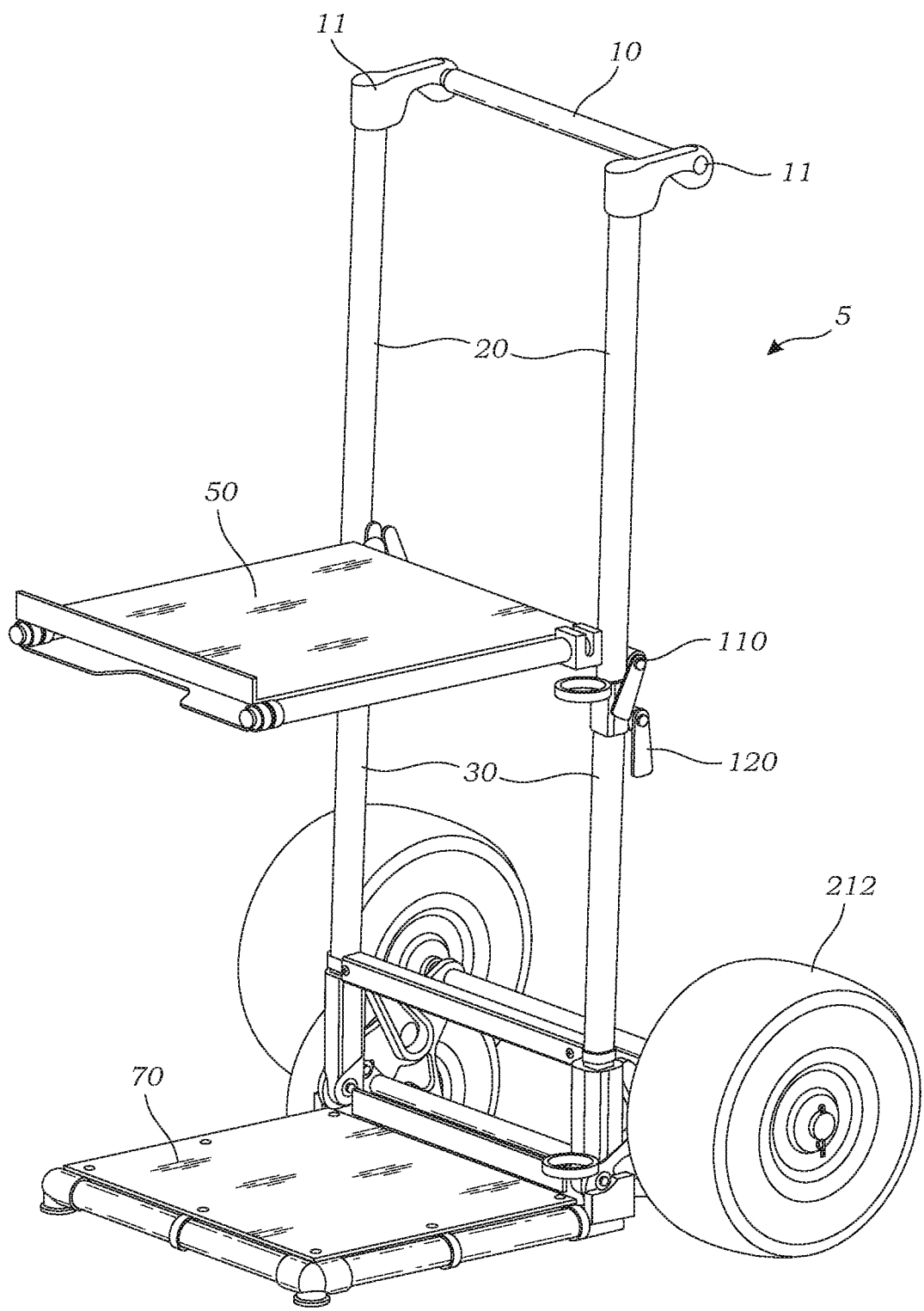
FIG. 2 is a front perspective view of the MFUC in an assembled, wherein said user elects to convert said multi-functional utility cart into an off-road dolly cart having two large dolly tires by inserting said axle into the two top holes of the three axle structures connected to the base and attached the two large dolly tires onto the axel and insert the wheel pins into each axel after the tires are positioned on the axel, ready for use configuration.

FIG. 2 is a front perspective view of the MFUC in an assembled, wherein said user elects to convert said multi-functional utility cart into an off-road dolly cart having two large dolly tires by inserting said axle into the two top holes of the three axle structures connected to the base and attached the two large dolly tires onto the axel and insert the wheel pins into each axel after the tires are positioned on the axel, ready for use configuration.

Figure 3:
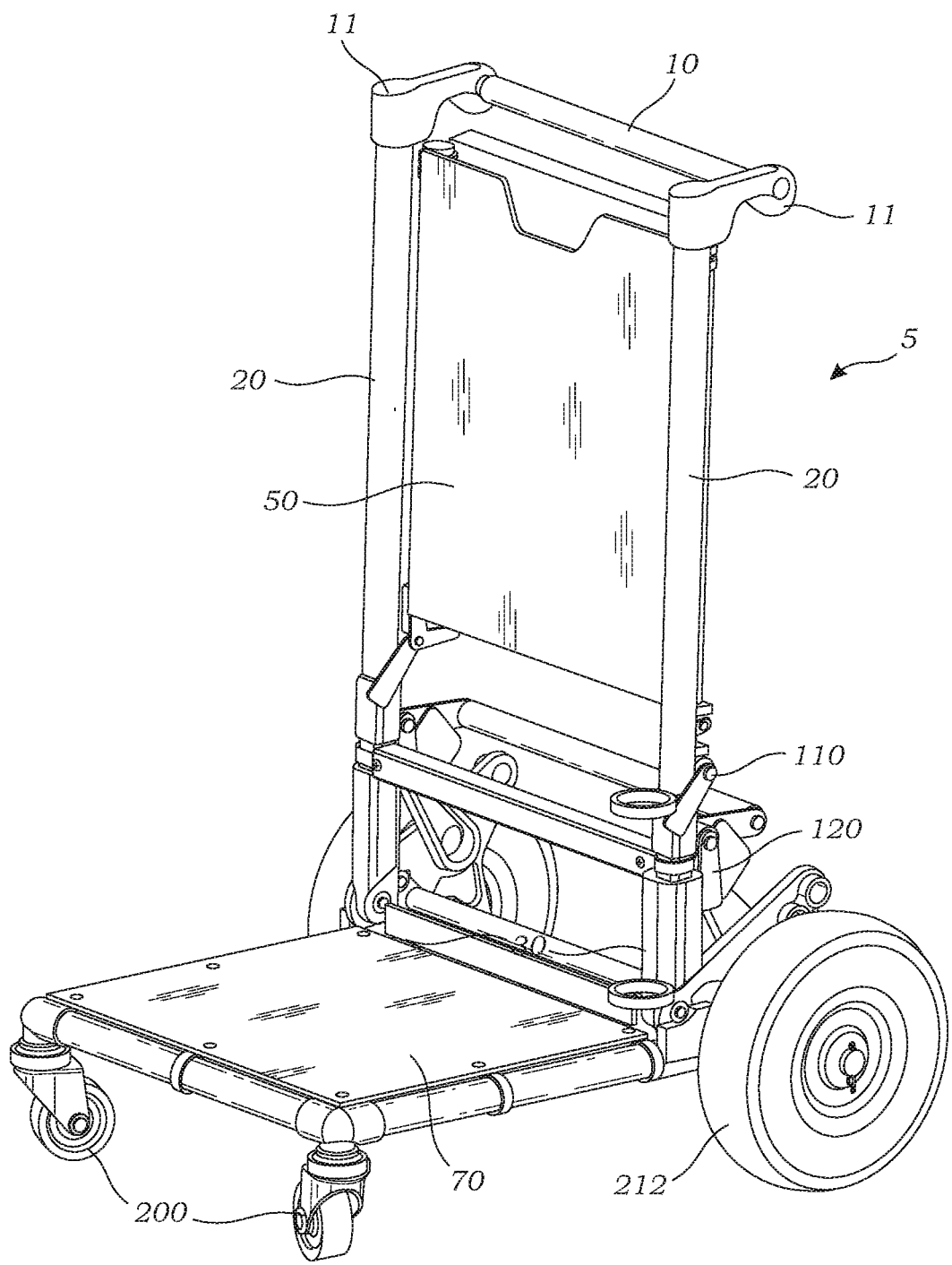
FIG. 3 is a perspective view of the MFUC, showing the two upper vertical tube frames are slide ably inserted into the connected two lower vertical tube frames to minimize the space for storage and not showing the foldable base in a folded position.

FIG. 3 is a perspective view of the MFUC, showing the two upper vertical tube frames are slide ably inserted into the connected two lower vertical tube frames to minimize the space for storage and not showing the foldable base in a folded position.

Figures 4, 5:
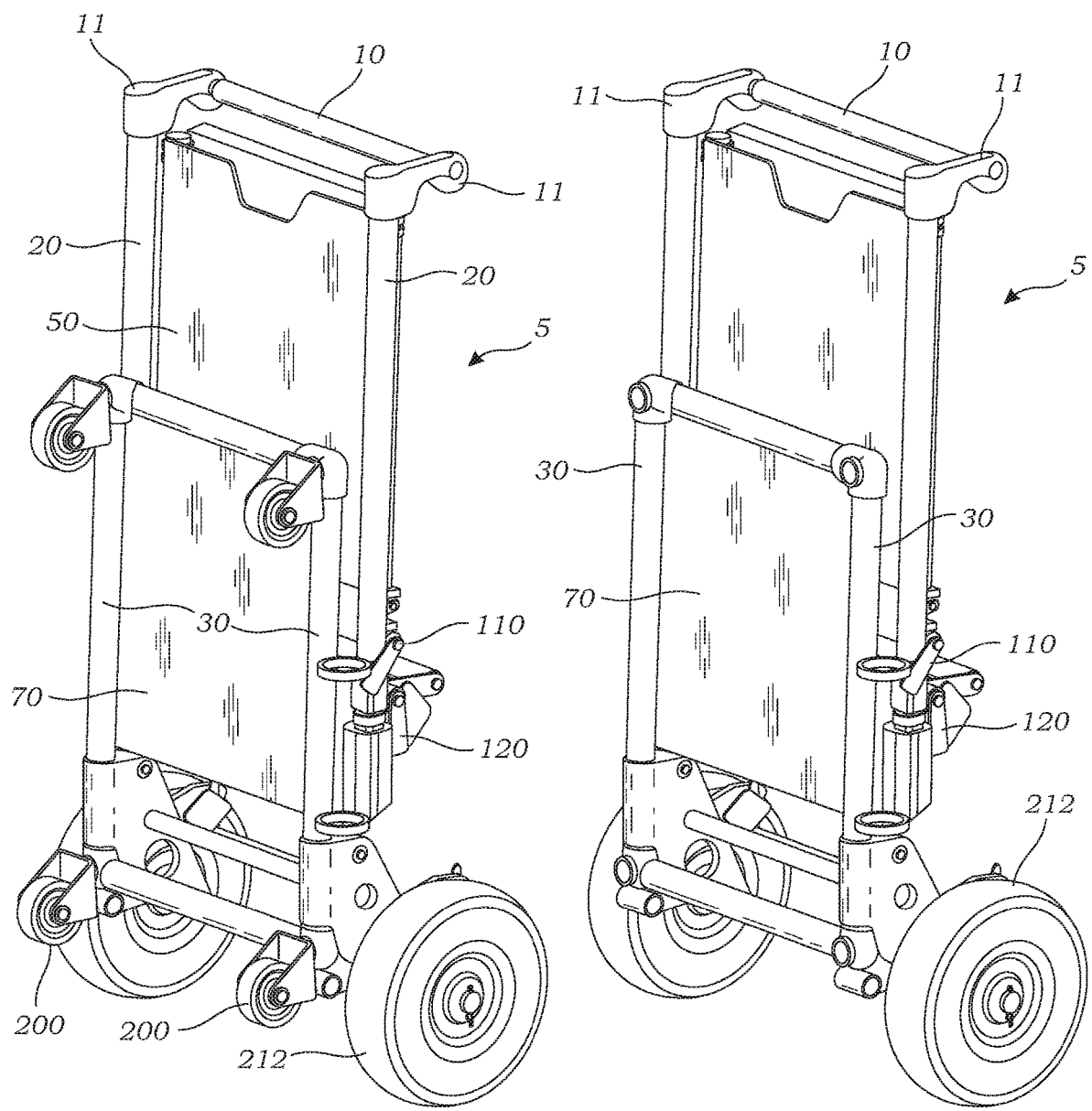
FIG. 4 is a perspective view of the MFUC, showing the said two upper vertical tube frames are slide ably connected to said two lower vertical tube frames and the foldable base in a folded position to minimize the space for storage, showing four casts wheels positioned on the bottom of the folded base.
FIG. 5 is a perspective view of the MFUC, showing the said two upper vertical tube frames are slide ably connected to said two lower vertical tube frames and the foldable base in a folded position to minimize the space for storage.

FIG. 4 is a perspective view of the MFUC, showing the said two upper vertical tube frames are slide ably connected to said two lower vertical tube frames and the foldable base in a folded position to minimize the space for storage, showing four casts wheels positioned on the bottom of the folded base.

FIG. 5 is a perspective view of the MFUC, showing the said two upper vertical tube frames are slide ably connected to said two lower vertical tube frames and the foldable base in a folded position to minimize the space for storage.

Figure 6:
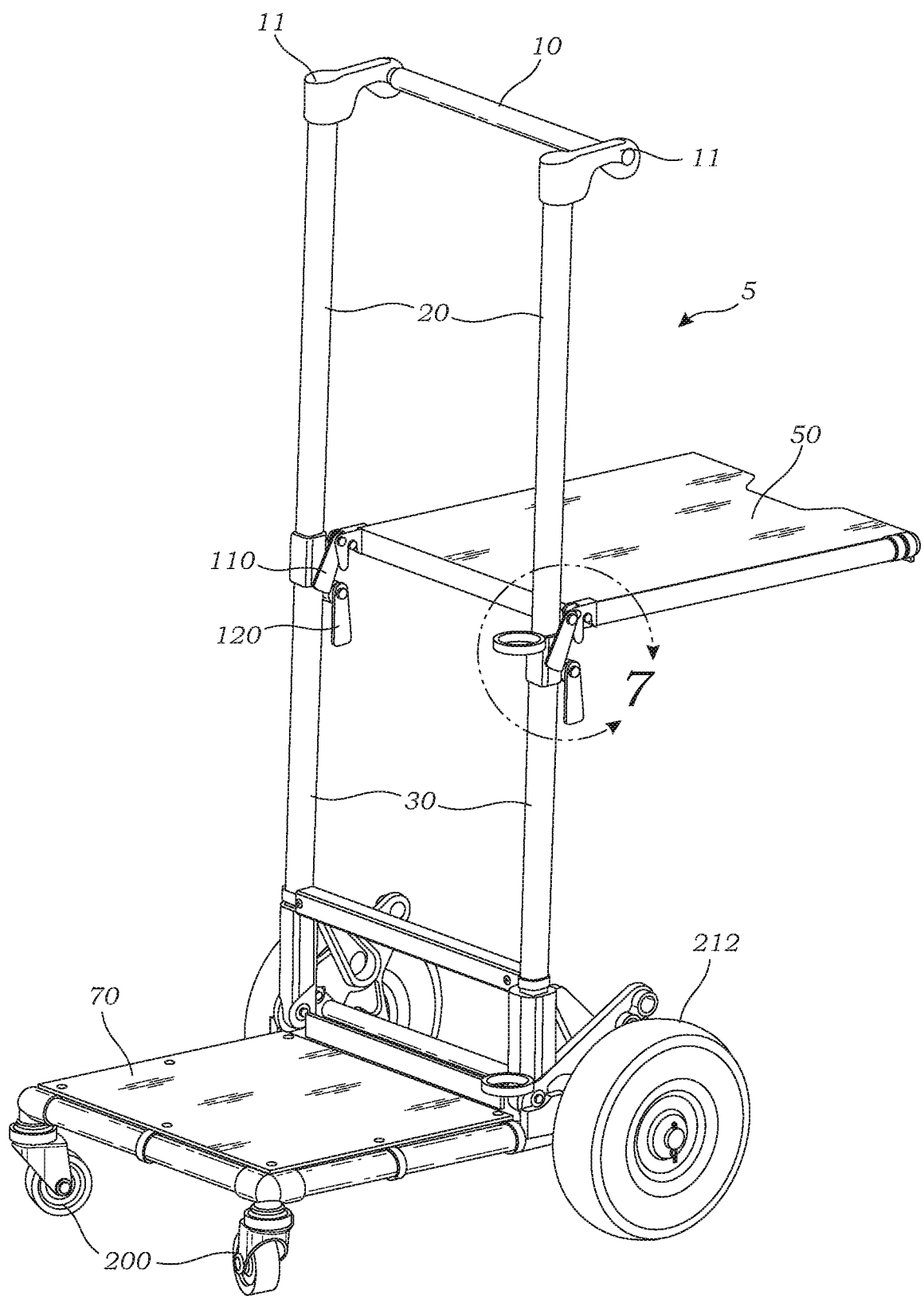
FIG. 6 is a perspective view of a multi-functional utility cart (MFUC) with two caster wheels and also two tire wheels by inserting two casters wheels into the front of the base and by inserting an axle into the two bottom holes of the three axle structures connected to the base and lower vertical tube frames, in an assembled, ready for use configuration, wherein the tray has pivoted from a front position to a back position to allow work to be performed on said tray.

FIG. 6 is a perspective view of a multi-functional utility cart (MFUC) with two caster wheels and also two tire wheels by inserting two casters wheels into the front of the base and by inserting an axle into the two bottom holes of the three axle structures connected to the base and lower vertical tube frames, in an assembled, ready for use configuration, wherein the tray has pivoted from a front position to a back position to allow work to be performed on said tray.

Figure 7:
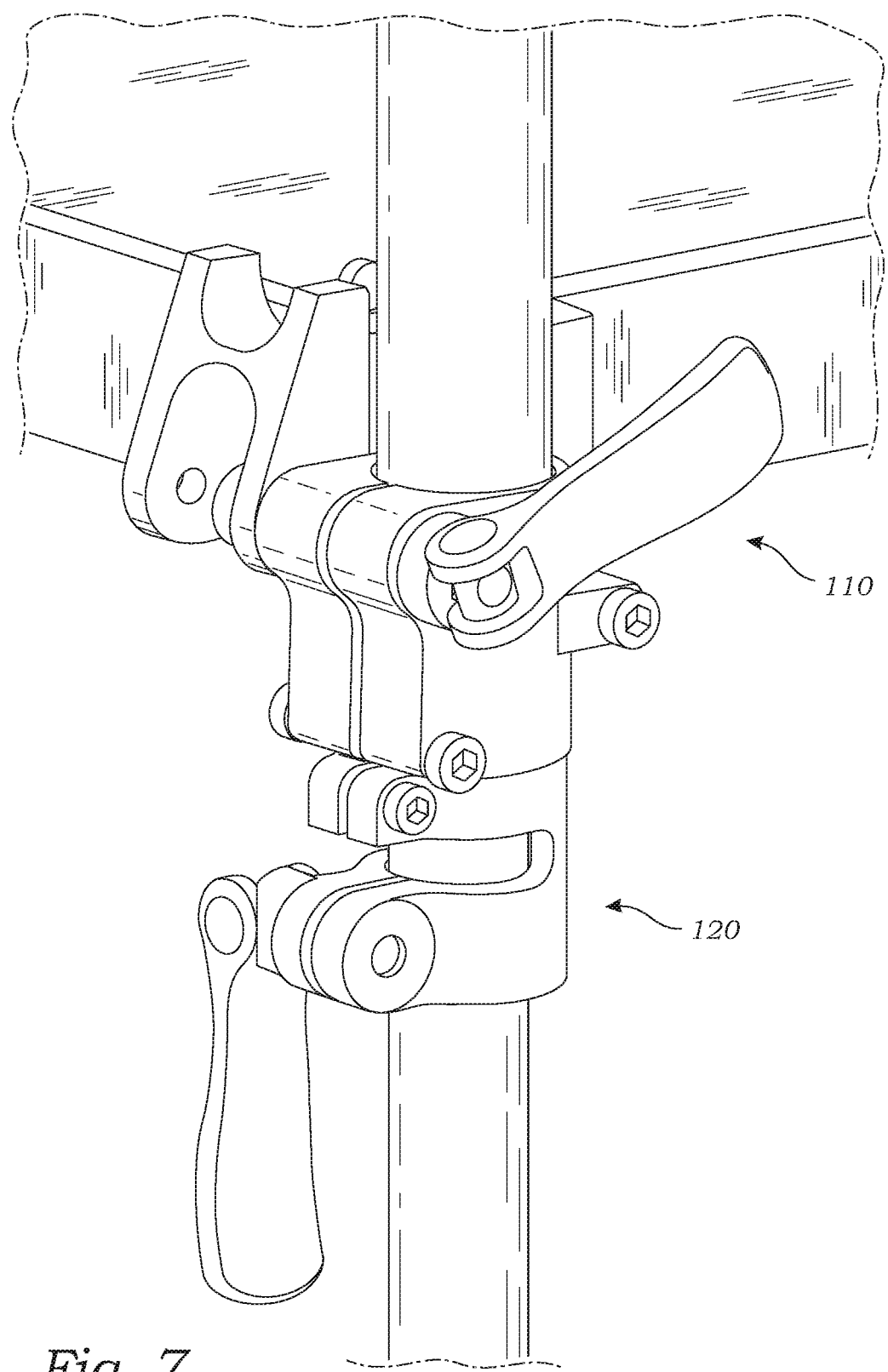
FIG. 7 is close up view of locking mechanism for the two upper vertical tube frames that are slide ably connected to said two lower vertical tube frames and the locking mechanism to allow for the tray to pivoted from a front position to a back position and back.

FIG. 7 is close up view of locking mechanism for the two upper vertical tube frames that are slide ably connected to said two lower vertical tube frames and the locking mechanism to allow for the tray to pivoted from a front position to a back position and back.

Figure 8:
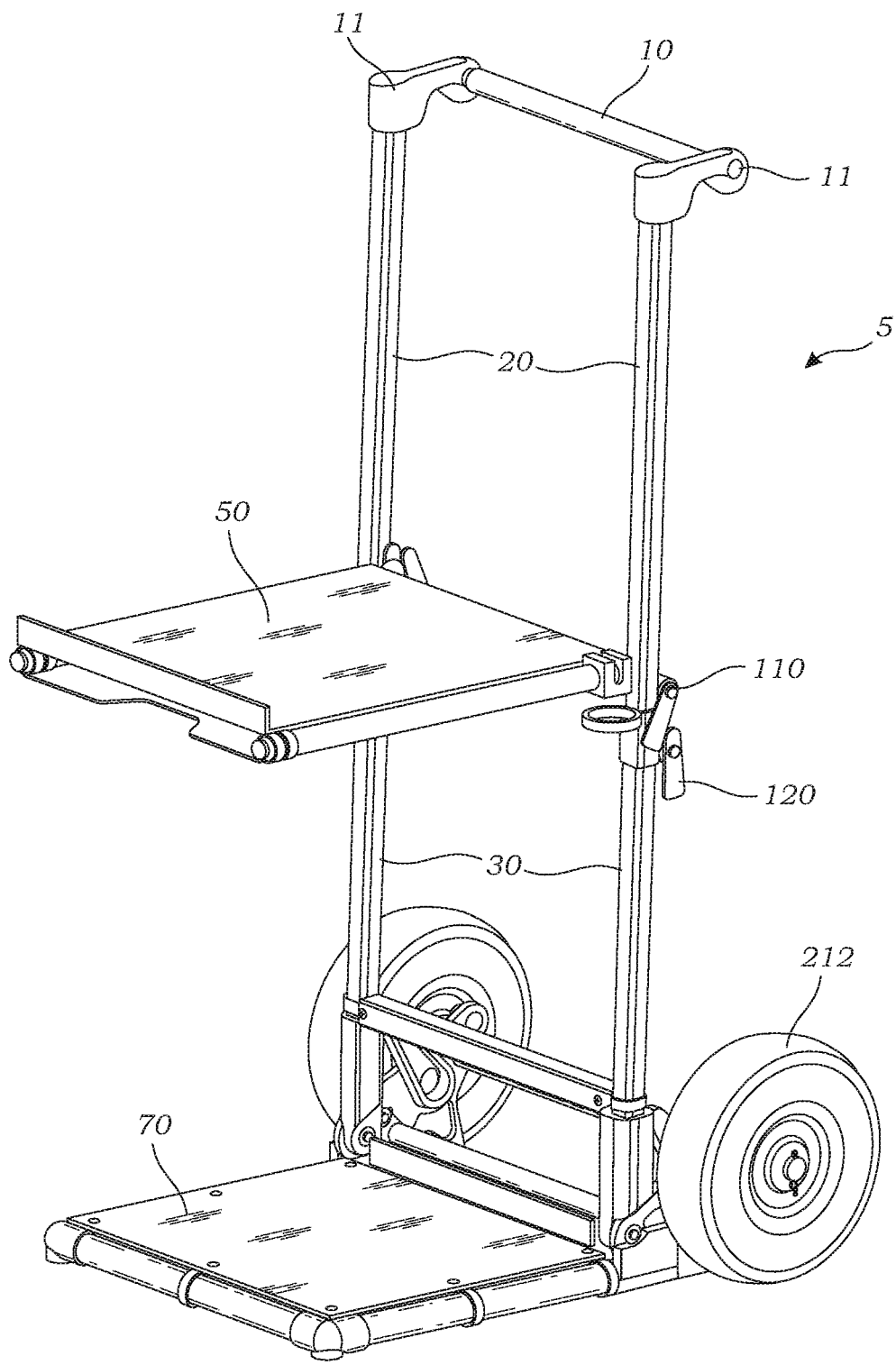
FIG. 8 is a front perspective view of the MFUC in an assembled, wherein said user elects to convert said multi-functional utility cart into an off-road dolly cart having two large dolly tires by inserting said axle into the two top holes of the three axle structures connected to the base and attached the two large dolly tires onto the axel and insert the wheel pins into each axel after the tires are positioned on the axel, ready for use configuration.
Figure 9:
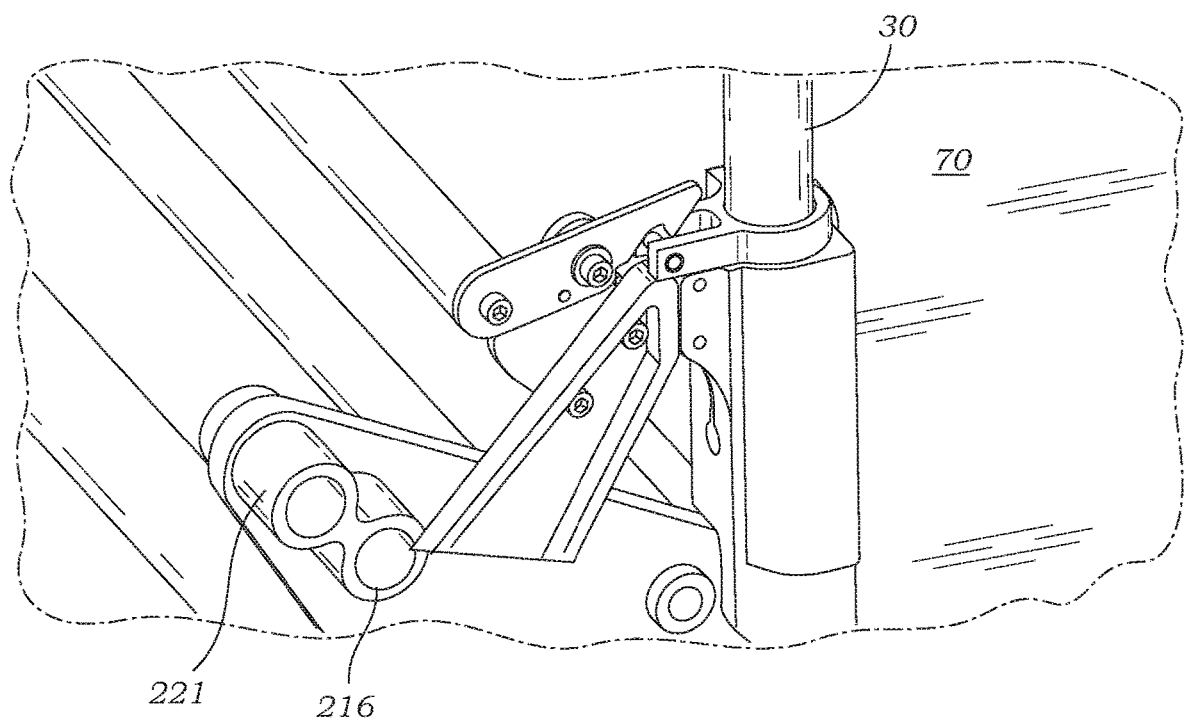
FIG. 9 is a close up view of locking mechanism for the foldable base of the MFUC.

FIG. 8 is a front perspective view of the MFUC in an assembled, wherein said user elects to convert said multi-functional utility cart into an off-road dolly cart having two large dolly tires by inserting said axle into the two top holes of the three axle structures connected to the base and attached the two large dolly tires onto the axel and insert the wheel pins into each axel after the tires are positioned on the axel, ready for use configuration, FIG. 9 is a close up view of locking mechanism for the foldable base of the MFUC.

Figure 10:
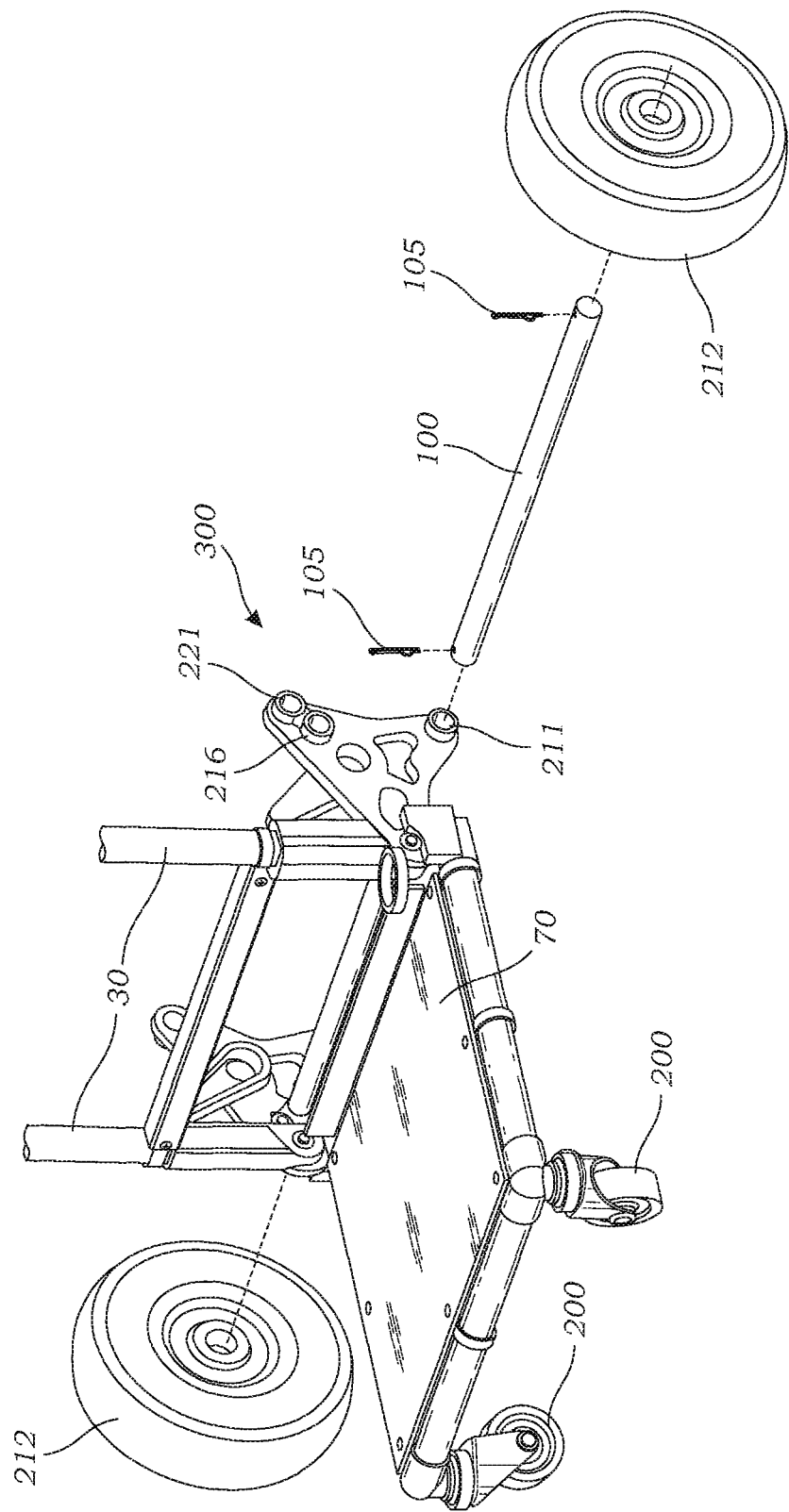
FIG. 10 is a close up view of the bottom portion of the MFUC with two caster wheels and the axle structure having three sets of holes to allow for the adjustment and placement of the axle rod at different heights, wherein the axle rod, wheels, and pin to lock the wheels into place are shown disassembled.

FIGS. 10-11D show that the MFUC can quickly and easily be assembled into four various functional configurations to adjust for various terrain that the cart will roll on. FIG. 10 is a close up view of the bottom portion of the MFUC with two caster wheels and the axle structure having three sets of holes to allow for the adjustment and placement of the axle rod at different heights, wherein the axle rod, wheels, and pin to lock the wheels into place are shown disassembled. FIG. 11A is a close up view of the bottom portion of the MFUC—showing one version of a multi-functional utility cart (MFUC) wherein said user elects to convert said multi-functional utility cart into a dolly cart having two caster wheels and also two tire wheels, wherein inserting two casters wheels into the front of the base and by inserting an axle into the two bottom holes of the three axle structures. FIG. 11B is a close up view of the bottom portion of the MFUC—showing second version of a multi-functional utility cart (MFUC) wherein said user elects to convert said multi-functional utility cart into a dolly cart having two dolly tires by inserting said axle into the two middle holes of the three axle structures. FIG. 11C is a close up view of the bottom portion of the MFUC—showing third version of a multi-functional utility cart (MFUC), wherein said user elects to convert said multi-functional utility cart into an off-road dolly cart having two large dolly tires by inserting said axle into the two top holes of the three axle structures. FIG. 11D is a close up view of the bottom portion of the MFUC—showing fourth version of a multi-functional utility cart (MFUC), wherein said user elects to convert said multi-functional utility cart into a four wheeled caster rolling utility cart by inserting four casters into said base to provide a smooth rolling surface for said utility cart.

The multi-functional utility cart (MFUC) assembly 5 comprising:

a handle 10 connected to two upper vertical tubes 20, said two upper vertical tubes 20 are slide ably connected to two lower vertical tubes frames 30, a rotational tray 50 connected to the upper vertical tubes 20, a foldable base 70 is connected to the two lower vertical tubes frames;

wherein a user can elect to utilize a wheel assembly having two three holed axle structures 300 for adjusting the axel height for utilizing different wheels and creating different carts for different tasks, such as: a caster rolling utility cart 205, a hybrid utility cart 210, a dolly cart 215, an off-road dolly cart 220;

wherein said user elects to convert said multi-functional utility cart 5 into said caster rolling utility cart 205 by inserting four casters 200 into said base 70 to provide a smooth rolling surface;

wherein said user elects to convert said multi-functional utility cart 5 into said hybrid utility cart 210 having two caster wheels 200 and also two tire wheels 212 by inserting two casters wheels 200 into the front of the base 70 and by inserting an axle 100 into the two bottom holes 211 of a three axle structure 300 connected to the base 70 and lower vertical tube frames 30 and insert the wheel pins 105 into the axel 100 after the tires 212 are positioned on the axel 100;

wherein said user elects to convert said multi-functional utility cart 5 into said dolly cart 215 having two dolly tires 217 by inserting said axle 100 into the two middle holes 216 of the three axle structures 300 connected to the base 70 and lower vertical tube frames 30 and attached the two dolly tires 217 onto the axel 100 and insert the wheel pins 105 into the axel 100 after the tires 217 are positioned on the axel 100;

wherein said user elects to convert said multi-functional utility cart 5 into said off-road dolly cart 220 having two large dolly tires 222 by inserting said axle 100 into the two top holes 221 of the three axle structures 300 connected to the base 70 and lower vertical tube frames 30 and attached the two large dolly tires 222 onto the axel 100 and insert the wheel pins 105 into the axel 100 after the tires 222 are positioned on the axel 100; and wherein said user elects to collapse said multi-functional utility cart 5, said user would minimize the size of said collapsible frame by sliding said two upper vertical tubes 20 into said two lower vertical tubes frames 30 and said user would fold up said foldable base 70 for easy storage and folding.

The MFUC as specified, wherein said base extends forward perpendicularly from a lower end of said lower structure, wherein said base folds upward to a position interfacing with and parallel to said lower structure.

The MFUC as specified wherein said lower structure comprise a lower right vertical tube, a lower left vertical tube, and a lower horizontal tube.

The MFUC as specified wherein said upper structure comprises an upper right vertical tube, an upper left vertical tube, and an upper horizontal tube.

The MFUC as specified, wherein a lower structure is slide able attached to an upper structure by two locking mechanism 120 positioned where the upper structure and lower structure meet, wherein said upper structure is slide able minimized when the upper structure having two upper vertical tubes 20 is slid down into the lower structure having two lower vertical tubes frames 30 to minimize the cart, and wherein said upper structure is slide able maximized when the upper structure is slid away from the lower structure to expand the cart.

The MFUC as specified, wherein an upper structure further comprises a handle 10 and two handle connectors 11 for attaching to each side of the upper structure for pushing and pulling said cart.

The MFUC as specified, wherein an upper structure further comprising said rotational tray 50 assembly that is pivotally attached to and extends forward perpendicularly from said upper structure, wherein said tray assembly folds upward to a position interfacing with and parallel to said upper structure, and wherein said tray assembly has two tray locking mechanism 110.

The MFUC as specified, wherein an upper structure further comprising said tray assembly 50 that is pivotally attached 110 to said upper structure and wherein said tray assembly can folds upward to a position interfacing with and parallel to said upper structure, and tray assembly that is pivotally attached to and extends forward perpendicularly from said upper structure, wherein said tray assembly that is pivotally attached to and can extend backward perpendicularly from said upper structure, and wherein said tray assembly that is pivotally attached to and can also extends forward perpendicularly from said upper structure.

The MFUC as specified wherein the means for pivotally attaching the components that comprise said cart is comprised of at least one nut and bolt combination.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A method of using a Multi-Functional Utility Cart "MFUC" comprising the steps of:

providing a multi-functional utility cart assembly having a handle connected to two upper vertical tubes, said two upper vertical tubes are slide ably connected to two lower vertical tubes frames, a rotational tray connected to the upper vertical tubes, a foldable base is connected to the two lower vertical tubes frames;

wherein a user can elect to utilize a wheel assembly having two three holed axle structures for adjusting the axle height for utilizing different wheels and creating different carts for different tasks, such as: a caster rolling utility cart, a hybrid utility cart, a dolly cart, an off-road dolly cart;

wherein said user elects to convert said multi-functional utility cart into said caster rolling utility cart by inserting four casters into said base to provide a smooth rolling surface;

wherein said user elects to convert said multi-functional utility cart into said hybrid utility cart having two caster wheels and also two tire wheels by inserting two casters wheels into the front of the base and by inserting an axle into the two bottom holes of a three axle structure connected to the base and lower vertical tube frames and insert the wheel pins into the axle after the tires are positioned on the axle;

wherein said user elects to convert said multi-functional utility cart into said dolly cart having two dolly tires by inserting said axle into the two middle holes of the three axle structures connected to the base and lower vertical tube frames and attached the two dolly tires onto the axle and insert the wheel pins into the axle after the tires are positioned on the axle;

wherein said user elects to convert said multi-functional utility cart into said off-road dolly cart having two large dolly tires by inserting said axle into the two top holes of the three axle structures connected to the base and lower vertical tube frames and attached the two large dolly tires onto the axle and insert the wheel pins into the axle after the tires are positioned on the axle; and wherein said user elects to collapse said multi-functional utility cart, said user would minimize the size of said collapsible frame by sliding said two upper vertical tubes into said two lower vertical tubes frames and said user would fold up said foldable base for easy storage and folding.

2. The method of MFUC as specified in claim 1, wherein said base extends forward perpendicularly from a lower end of a lower structure, wherein said base folds upward to a position interfacing with and parallel to said lower structure.

3. The method of MFUC as specified in claim 1, wherein a lower structure comprise a lower right vertical tube frame, a lower left vertical tube frame, and a lower horizontal tube frame.

4. The method of MFUC as specified in claim 1, wherein an upper structure comprises an upper right vertical tube, and an upper left vertical tube.

5. The method of MFUC as specified in claim 1, wherein a lower structure is slide able attached to an upper structure by two locking mechanism positioned where the upper structure and lower structure meet, wherein said upper structure is slide able minimized when the upper structure having two upper vertical tubes is slid down into the lower structure having two lower vertical tubes frames to minimize the cart, and wherein said upper structure is slide able maximized when the upper structure is slid away from the lower structure to expand the cart.

6. The method of MFUC as specified in claim 1, wherein an upper structure further comprises a handle and two handle connectors for attaching to each side of the upper structure for pushing and pulling said cart.

7. The method of MFUC as specified in claim 1, wherein an upper structure further comprising a tray assembly that is pivotally attached to and extends forward perpendicularly from said upper structure, wherein said tray assembly folds upward to a position interfacing with and parallel to said upper structure, and wherein said tray assembly has two tray locking mechanism.

8. The method of MFUC as specified in claim 1 wherein an upper structure further comprising a tray assembly that is pivotally attached to said upper structure and wherein said tray assembly can folds upward to a position interfacing with and parallel to said upper structure, and tray assembly that is pivotally attached to and extends forward perpendicularly from said upper structure, wherein said tray assembly that is pivotally attached to and can extend backward perpendicularly from said upper structure, and wherein said tray assembly that is pivotally attached to and can also extends forward perpendicularly from said upper structure.

9. The method of MFUC as specified in claim 1 wherein the means for pivotally attaching the components that comprise said cart is comprised of at least one nut and bolt combination.

10. A method of using a Multi-functional utility cart comprising the steps of:
providing a multi-functional utility cart assembly comprising: a base, an axle and an axle assembly, a lower structure, and an upper structure, wherein said axle assembly are attached to said base, said base is pivotally attached to said lower structure, said lower structure is pivotally attached to said upper structure, a handle connected to two upper structural vertical tubes, said two upper structural vertical tube frames are slide ably connected to two lower structural vertical tube frames, a rotational tray connected to the upper vertical structural tube frames, a foldable base is connected to the two lower structural vertical tube frames;

wherein a user elects to collapse said multi-functional utility cart for easy storage and folding, wherein said user would minimize the size of said collapsible frame by sliding said two upper vertical tubes into said two lower vertical tube frames and said user would fold up said base;

wherein said user can elect to utilize a wheel assembly having two three holed axle structures for adjusting the axle height for utilizing different wheels and creating different carts for different tasks;

wherein said user elects to convert said multi-functional utility cart into a four wheeled caster rolling utility cart by inserting four casters into said base to provide a smooth rolling surface for said utility cart;

wherein said user elects to convert said multi-functional utility cart into a hybrid utility cart having two caster wheels and also two tire wheels by inserting two casters wheels into the front of the base and by inserting an axle into the two bottom holes of the three axle structures connected to the base and lower vertical tube frames;

wherein said user elects to convert said multi-functional utility cart into a dolly cart having two dolly tires by inserting said axle into the two middle holes of the three axle structures connected to the base and attached the two dolly tires onto the axle and insert the wheel pins into each axle after the tires are positioned on the axle; and wherein said user elects to convert said multi-functional utility cart into an off-road dolly cart having two large dolly tires by inserting said axle into the two top holes of the three axle structures connected to the base and attached the two large dolly tires onto the axle and insert the wheel pins into each axle after the tires are positioned on the axle.

11. The method of MFUC as specified in claim 10, wherein said base extends forward perpendicularly from a lower end of said lower structure, wherein said base folds upward to a position interfacing with and parallel to said lower structure.

12. The method of MFUC as specified in claim 10 wherein said lower structure comprise a lower right vertical tube, a lower left vertical tube, and a lower horizontal tube.

13. The method of MFUC as specified in claim 10 wherein said upper structure comprises an upper right vertical tube, an upper left vertical tube.

14. The method of MFUC as specified in claim 10 wherein said lower structure is slide able attached to said upper structure by two locking mechanism positioned where the upper structure and lower structure meet, wherein said upper structure is slide able minimized when the upper structure is slid down into the lower structure to minimize the cart, and wherein said upper structure is slide able maximized when the upper structure is slid away from the lower structure to expand the cart.

15. The method of MFUC as specified in claim 10 wherein said upper structure further comprises a handle and two handle connectors for attaching to each side of the upper structure for pushing and pulling said cart.

16. The method of MFUC as specified in claim 10 wherein said upper structure further comprising a tray assembly that is pivotally attached to and extends forward perpendicularly from said upper structure, wherein said tray assembly folds upward to a position interfacing with and parallel to said upper structure, and wherein said tray assembly has two tray locking mechanism.

17. The method of MFUC as specified in claim 10 wherein said upper structure further comprising a tray assembly that is pivotally attached to said upper structure and wherein said tray assembly can folds upward to a position interfacing with and parallel to said upper structure, and tray assembly that is pivotally attached to and extends forward perpendicularly from said upper structure, wherein said tray assembly that is pivotally attached to and can extend backward perpendicularly from said upper structure, and wherein said tray assembly that is pivotally attached to and can also extends forward perpendicularly from said upper structure.

18. The method of MFUC as specified in claim 10 wherein the means for pivotally attaching the components that comprise said cart is comprised of at least one nut and bolt combination.

19. A multi-functional utility cart comprising: a base, an axle and wheel assembly, a lower structure, and an upper structure, wherein said axle and wheel assembly are attached to said base, said base is pivotally attached to said lower structure, said lower structure is pivotally attached to said upper structure, a handle connected to two upper structural vertical tubes, said two upper structural vertical tube frames are slide ably connected to two lower structural vertical tube frames, a rotational tray connected to the upper vertical structural tube frames, a foldable base is connected to the two lower structural vertical tube frames;
    wherein a user can elect to utilize a wheel assembly having two three holed axle structures for adjusting the axle height for utilizing different wheels and creating different carts for different tasks;
    wherein said user elects to collapse said multi-functional utility cart for easy storage and folding, wherein said user would minimize the size of said collapsible frame by sliding said two upper vertical tubes into said two lower vertical tube frames and said user would fold up said base;
    wherein said user elects to convert said multi-functional utility cart into a four wheeled caster rolling utility cart by inserting four casters into said base to provide a smooth rolling surface for said utility cart;
    wherein said user elects to convert said multi-functional utility cart into a hybrid utility cart having two caster wheels and also two tire wheels by inserting two casters wheels into the front of the base and by inserting an axle into the two bottom holes of the three axle structures connected to the base and lower vertical tube frames;
    wherein said user elects to convert said multi-functional utility cart into a dolly cart having two dolly tires by inserting said axle into the two middle holes of the three axle structures connected to the base and attached the two dolly tires onto the axle and insert the wheel pins into each axle after the tires are positioned on the axle; and
    wherein said user elects to convert said multi-functional utility cart into an off-road dolly cart having two large dolly tires by inserting said axle into the two top holes of the three axle structures connected to the base, and attached the two large dolly tires onto the axle and insert the wheel pins into each axle after the tires are positioned on the axle.

* * * * *